US009372097B2

(12) United States Patent
Kohn et al.

(10) Patent No.: US 9,372,097 B2
(45) Date of Patent: Jun. 21, 2016

(54) ROTATION RATE SENSOR AND METHOD FOR CALIBRATING A ROTATION RATE SENSOR

(75) Inventors: Oliver Kohn, Reutlingen (DE); Thomas Claus, Tuebingen (DE); Fouad Bennini, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 263 days.

(21) Appl. No.: 14/008,835

(22) PCT Filed: Feb. 24, 2012

(86) PCT No.: PCT/EP2012/053216
§ 371 (c)(1),
(2), (4) Date: Dec. 6, 2013

(87) PCT Pub. No.: WO2012/130540
PCT Pub. Date: Oct. 4, 2012

(65) Prior Publication Data
US 2014/0102168 A1 Apr. 17, 2014

(30) Foreign Application Priority Data
Mar. 30, 2011 (DE) .......................... 10 2011 006 427

(51) Int. Cl.
*G01P 21/00* (2006.01)
*G01C 25/00* (2006.01)
(Continued)

(52) U.S. Cl.
CPC ................ *G01C 25/00* (2013.01); *G01C 19/56* (2013.01); *G01C 19/5726* (2013.01); *G01C 19/5747* (2013.01); *G01C 25/005* (2013.01)

(58) Field of Classification Search
CPC .... G01C 17/38; G01C 25/005; G01D 18/008; G01P 21/00; G01P 15/18
See application file for complete search history.

(56) References Cited

U.S. PATENT DOCUMENTS 5,479,161 A * 12/1995 Keyes et al. ............. 340/870.04
5,801,507 A * 9/1998 Nakamura ............... G01P 15/18
318/648
(Continued)

FOREIGN PATENT DOCUMENTS

DE  10 2007 060 773  6/2009
JP  3-257373  11/1991
(Continued)

OTHER PUBLICATIONS

Fong et al., "Methods for In-Field User Calibration of an Inertial Measurement Unit Without External Equipment", Measuring Science and Technology, No. 19, Aug. 1, 2008.*
(Continued)

*Primary Examiner* — David A Rogers
(74) *Attorney, Agent, or Firm* — Norton Rose Fulbright US LLP

(57) ABSTRACT

A rotational rate sensor is provided having a substrate and a Coriolis element, the rotational rate sensor having a drive means for exciting the Coriolis element to a Coriolis oscillation, and the rotational rate sensor having a detection device for producing a sensor signal as a function of a deflection of the Coriolis element relative to the substrate on the basis of a Coriolis force acting on the Coriolis element, and in addition the rotational rate sensor being configured to carry out a self-calibration when a rotational acceleration signal produced as a function of the sensor signal falls below a specified threshold value.

11 Claims, 2 Drawing Sheets

(51) Int. Cl.
    *G01C 19/5726*     (2012.01)
    *G01C 19/5747*     (2012.01)
    *G01C 19/56*     (2012.01)

(56) References Cited

U.S. PATENT DOCUMENTS

| | | | |
|---|---|---|---|
| 6,243,654 B1 * | 6/2001 | Johnson et al. | 702/85 |
| 6,321,171 B1 * | 11/2001 | Baker | 702/104 |
| 6,810,738 B2 * | 11/2004 | Sakaguchi | 73/510 |
| 7,316,161 B2 * | 1/2008 | Willig et al. | 73/504.12 |
| 7,359,816 B2 | 4/2008 | Kumar et al. | |
| 7,930,148 B1 * | 4/2011 | Figaro et al. | 702/196 |
| 8,117,888 B2 * | 2/2012 | Chan et al. | 73/1.38 |
| 8,408,059 B2 * | 4/2013 | Pruetz | 73/504.12 |
| 8,490,483 B2 * | 7/2013 | Wrede et al. | 73/504.12 |
| 8,972,180 B1 * | 3/2015 | Zhao et al. | 701/468 |
| 2005/0256659 A1 * | 11/2005 | Malvern et al. | 702/96 |
| 2006/0169021 A1 | 8/2006 | Silverstein | |
| 2007/0205982 A1 * | 9/2007 | Ishidera et al. | 345/158 |
| 2007/0216361 A1 * | 9/2007 | Zelinski et al. | 320/132 |
| 2008/0236242 A1 * | 10/2008 | Stewart | 73/1.38 |
| 2009/0217733 A1 * | 9/2009 | Stachow et al. | 73/1.37 |
| 2010/0019777 A1 * | 1/2010 | Balslink | 324/633 |
| 2010/0064804 A1 * | 3/2010 | Kawakubo et al. | 73/504.03 |
| 2011/0029275 A1 * | 2/2011 | Kennedy et al. | 702/141 |
| 2011/0066395 A1 * | 3/2011 | Judd | 702/104 |
| 2011/0126621 A1 * | 6/2011 | Neul | 73/504.12 |
| 2011/0167891 A1 * | 7/2011 | Geen | 73/1.38 |
| 2011/0232359 A1 * | 9/2011 | Caron | 73/1.77 |
| 2011/0264393 A1 * | 10/2011 | An et al. | 702/104 |
| 2011/0288772 A1 * | 11/2011 | Tanino | 701/214 |
| 2011/0288805 A1 * | 11/2011 | Dejnabadi et al. | 702/96 |
| 2012/0026834 A1 * | 2/2012 | Muyzert et al. | 367/58 |
| 2012/0035496 A1 * | 2/2012 | Denison et al. | 600/547 |
| 2012/0203486 A1 * | 8/2012 | Almalki et al. | 702/96 |
| 2012/0215477 A1 * | 8/2012 | Tuck | G01P 21/00 702/99 |
| 2012/0229385 A1 * | 9/2012 | Fu | 345/163 |

FOREIGN PATENT DOCUMENTS

| | | |
|---|---|---|
| JP | 2000-28367 | 1/2000 |
| JP | 2000-65576 | 3/2000 |
| JP | 2000-146595 | 5/2000 |
| JP | 2005-167918 | 6/2005 |
| JP | 2007-40762 | 2/2007 |
| JP | 2009264759 A1 * | 11/2009 |

OTHER PUBLICATIONS

Machine Translation for DE 102007060773 A1, which originally published on Jun. 18, 2009.*
International Search Report, PCT International Application No. PCT/EP2012/053216, May 4, 2012.

* cited by examiner

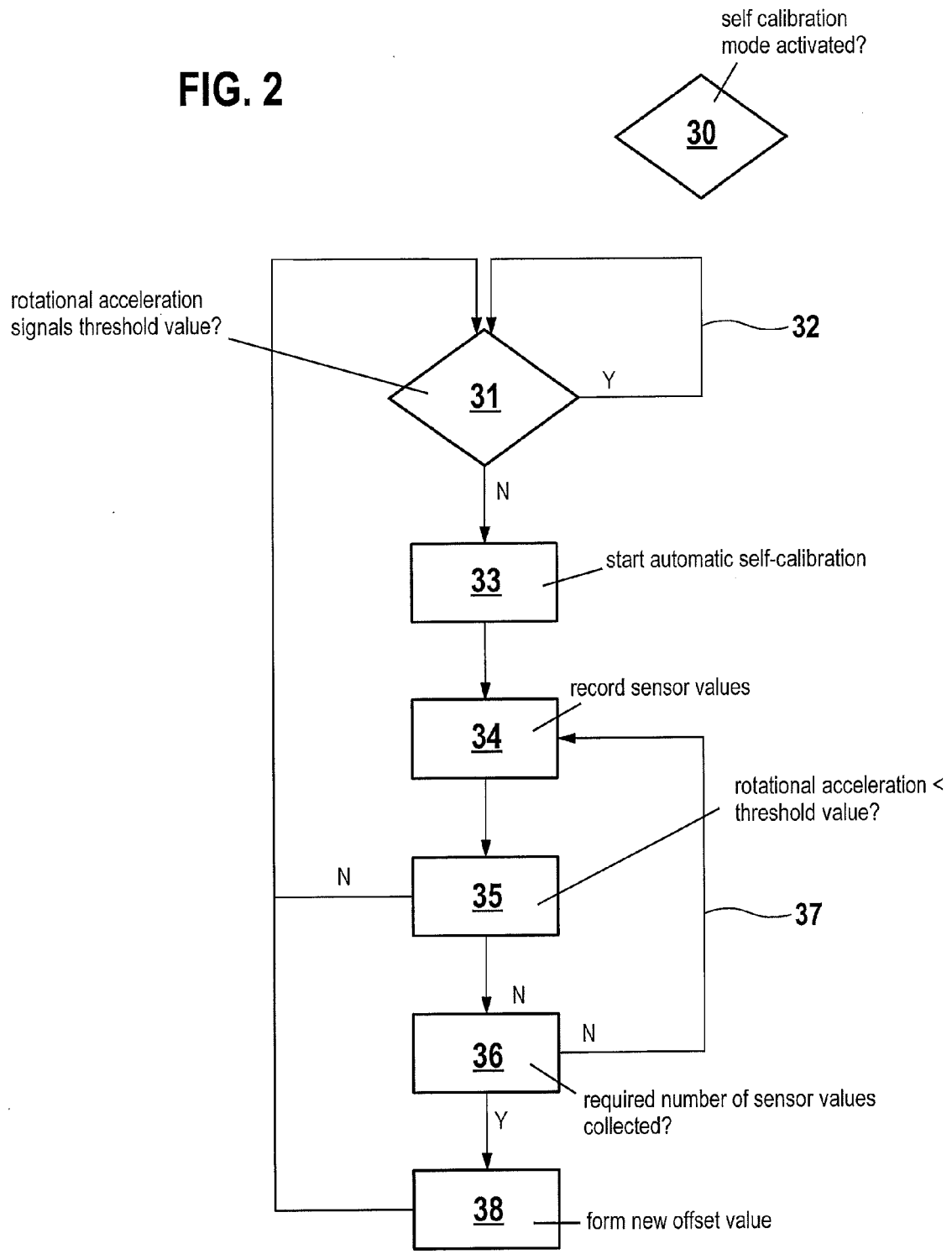

ROTATION RATE SENSOR AND METHOD FOR CALIBRATING A ROTATION RATE SENSOR

FIELD

The present invention is based on a rotational rate sensor.

BACKGROUND INFORMATION

Rotational rate sensors are generally available. For example, U.S. Pat. No. 7,359,816 B2 describes a rotational rate sensor that produces an output signal as a function of a detected rotational rate. In order to calibrate the rotational rate sensor, the rotational rate sensor generates an output signal in the moving state and in the resting state, and this signal is transmitted to an external calibrating module. Subsequently, an offset parameter for the rotational rate sensor is calculated using a mathematical mean value formation over all the values of the output signal recorded both in the state of motion and in the state of rest. The rotational rate sensor is calibrated using the calculated offset parameter. A disadvantage of this sensor system is that for the calibration of the rotational rate sensor an external calibration module is required, for example an external microcontroller or an external ASIC (Application-Specific Integrated Circuit), by which the rotational rate sensor is triggered to carry out the calibration method.

SUMMARY

An example rotational rate sensor in accordance with the present invention and the method according to the present invention for calibrating a rotational rate sensor may have the advantage that for the calibration of the rotational rate sensor a self-calibration of the rotational rate sensor is provided that is not triggered by an additional external calibration module. In this way, for example an automatic and self-contained recalibration of the rotational rate sensor can be carried out as soon as the rotational rate sensor detects that the external boundary conditions at the relevant point in time permit a calibration. For this purpose, the rotational acceleration signal is compared to a threshold value. If the rotational acceleration signal is below the threshold value, it is assumed that the rotational rate sensor is in a state of rest, i.e., there is for example no rotational rate. Advantageously, the rotational rate sensor thus autonomously recognizes when a favorable time is present for starting the self-calibration. The self-calibration is preferably carried out autonomously by the rotational rate sensor on the basis of the sensor data, in particular the sensor values, recorded in the detected rest state by determining from the sensor data a sensor offset, for example by mathematical averaging, and storing it in a storage element of the rotational rate sensor. The threshold value, which determines when the self-calibration is to be started, is preferably preset and is capable of being adjusted. In particular, in this way the desired precision of the self-calibration can be continuously adjusted on the basis of the threshold value, so that the rotational rate sensor can be adapted to the particular case of application. The rotational rate sensor preferably includes a rotational rate sensor based on a semiconductor substrate, preferably silicon, particularly preferably produced in a silicon surface micromechanical process.

According to a preferred specific embodiment, it is provided that the rotational rate sensor has a comparator for comparing the rotational acceleration signal to the threshold value. Advantageously, in this way the comparator is used to decide whether the self-calibration method is to be carried out. A comparator is a comparatively simple logical component that is preferably capable of being placed immediately on the substrate of the rotational rate sensor in order to achieve a system integration that is as spatially compact as possible.

According to a preferred specific embodiment, it is provided that the rotational rate sensor has a different value formation unit that is configured to produce the rotational acceleration signal from the difference of at least two sensor values, in particular following one another immediately or mediately, of the sensor signal, and/or that the rotational rate sensor has a differentiator that is configured to produce the rotational acceleration signal from the mathematical derivative of the sensor signal. Advantageously, through the difference formation between two sensor values a relative value is produced that is largely independent of a sensor offset and is also to be used, in the case of a not yet calibrated rotational rate sensor, as a measure of the momentary dynamic characteristic of the rotational rate sensor. If the difference between the two sensor values is below the threshold value, it is to be assumed that the dynamic is comparatively small, or that the rotational rate sensor is in a state of rest. The two sensor values are preferably two immediately successive sensor values or two mediately successive sensor values, meaning that additional sensor values lie between the two mediately successive sensor values.

According to a preferred specific embodiment, it is provided that the rotational rate sensor has an intermediate storage device that is configured for the storage of a multiplicity of sensor values of the sensor signal during the execution of the self-calibration, the intermediate storage device being configurable in particular for the storage of the sum of the multiplicity of sensor values of the sensor signal during the execution of the self-calibration. Such volatile intermediate storage devices can be realized so as to be comparatively simple and compact in size, for example by simple electrical capacitors situated immediately in the rotational rate sensor itself. Advantageously, an expensive data interface for storing the sensor values in external storage elements is not required. According to a preferred specific embodiment, the sensor values are simply summed in the intermediate storage device, i.e. only the sum of the sensor values is stored in the intermediate storage device, so that, advantageously, only a single value has to be stored.

According to a preferred specific embodiment, it is provided that the rotational rate sensor has a mean value formation unit that is configured to produce a sensor offset value from the mathematical mean value of the sensor values stored in the intermediate storage device, the rotational rate sensor having an offset storage device that is preferably configured to store a sensor offset calculated as a function both of the new sensor offset value and of an earlier sensor offset value. The preceding threshold value comparison ensures that the recorded sensor values are only those values that are outputted by the rotational rate sensor during the state of rest of the rotational rate sensor. The mean value over all sensor values is therefore a measure of the offset of the rotational rate sensor due to, for example, production or installation conditions. The calculation of the sensor offset that is newly to be stored in the offset storage device takes place on the basis of the new sensor offset value determined from the sensor values; in addition, in particular an earlier sensor offset value, which was for example already stored in the offset storage device at a time before the execution of the current self-calibration, is also taken into account.

According to a preferred specific embodiment, it is provided that the rotational rate sensor has an interrupt interface, the rotational rate sensor being configured to produce an interrupt signal at the interrupt interface during or after the execution of the self-calibration. Advantageously, in this way it is signaled to an external evaluation electronics connected downstream from the rotational rate sensor that the rotational rate sensor is currently carrying out or has already carried out a self-calibration.

In accordance with the present invention, an example method for calibrating a rotational rate sensor is provided in which the Coriolis element is excited to Coriolis oscillation, and that the sensor signal is produced as a function of a deflection of the Coriolis element relative to the substrate due to a Coriolis force acting on the Coriolis element, a rotational acceleration signal being produced as a function of the sensor signal, and a self-calibration of the rotational rate sensor being carried out when it is detected that the rotational acceleration signal has fallen below a predetermined threshold value. Advantageously, through the comparison of the rotational acceleration value to the threshold value it is detected whether the rotational rate sensor is in a defined rest position. If a rest position is present, the self-calibration of the rotational rate sensor is started. The rotational rate sensor itself is thus used as a sensor for detecting the rest position, so that no trigger signal from outside the rotational rate sensor is necessary to start the self-calibration. In order to carry out the comparison and the self-calibration, only logical components having a relatively simple construction are required, such as a comparator, a volatile memory device or the like, preferably situated immediately on the substrate of the rotational rate sensor. No external calibration modules are therefore required for the calibration of the rotational rate sensor. Through corresponding setting of the threshold value, the requirements on the rest position, i.e., from which rotational rates the state of the rotational rate sensor is no longer regarded as a rest position, can be continuously adjusted.

According to a preferred specific embodiment, it is provided that the self-calibration is started when the rotational acceleration signal falls below the threshold value for a specified span of time. Advantageously, in this way it is determined how long the rotational rate sensor has to be in the rest position until the self-calibration is carried out. In order to determine the time span, a time parameter that can be set externally is preferably provided.

According to a preferred specific embodiment, it is provided that the rotational acceleration signal is produced from the difference between two successive sensor values of the sensor signal and/or from the mathematical derivative of the sensor signal. In this way, it is advantageously determinable whether a state of rest is present, even if the rotational rate sensor has not yet been calibrated, or has been calibrated only imprecisely.

According to a preferred specific embodiment, it is provided that for the self-calibration of the rotational rate sensor, a multiplicity of sensor values of the sensor signal are recorded, preferably only the sum of the sensor values being stored, and a new sensor offset value is calculated from the sensor values as a function of a mathematical mean value, a sensor offset preferably being calculated as a function both of the new sensor offset value and as a function of an old sensor offset value. In this way, a determination of the sensor offset is easily possible.

According to a preferred specific embodiment, it is provided that the self-calibration is terminated if, during the self-calibration, it is detected that the rotational acceleration signal has exceeded the specified threshold value. In this way, it is ensured that the rotational rate sensor remains in the rest state during the self-calibration, and that during the self-calibration no falsified calibration result is produced due to sudden accelerations of the rotational rate sensor.

Exemplary embodiments of the present invention are shown in the figures and are explained in more detail below.

BRIEF DESCRIPTION OF THE DRAWINGS

FIG. 2 shows a schematic block diagram of a method for calibrating a rotational rate sensor according to an exemplary second specific embodiment of the present invention.

DETAILED DESCRIPTION OF EXAMPLE EMBODIMENTS

Figure 1:
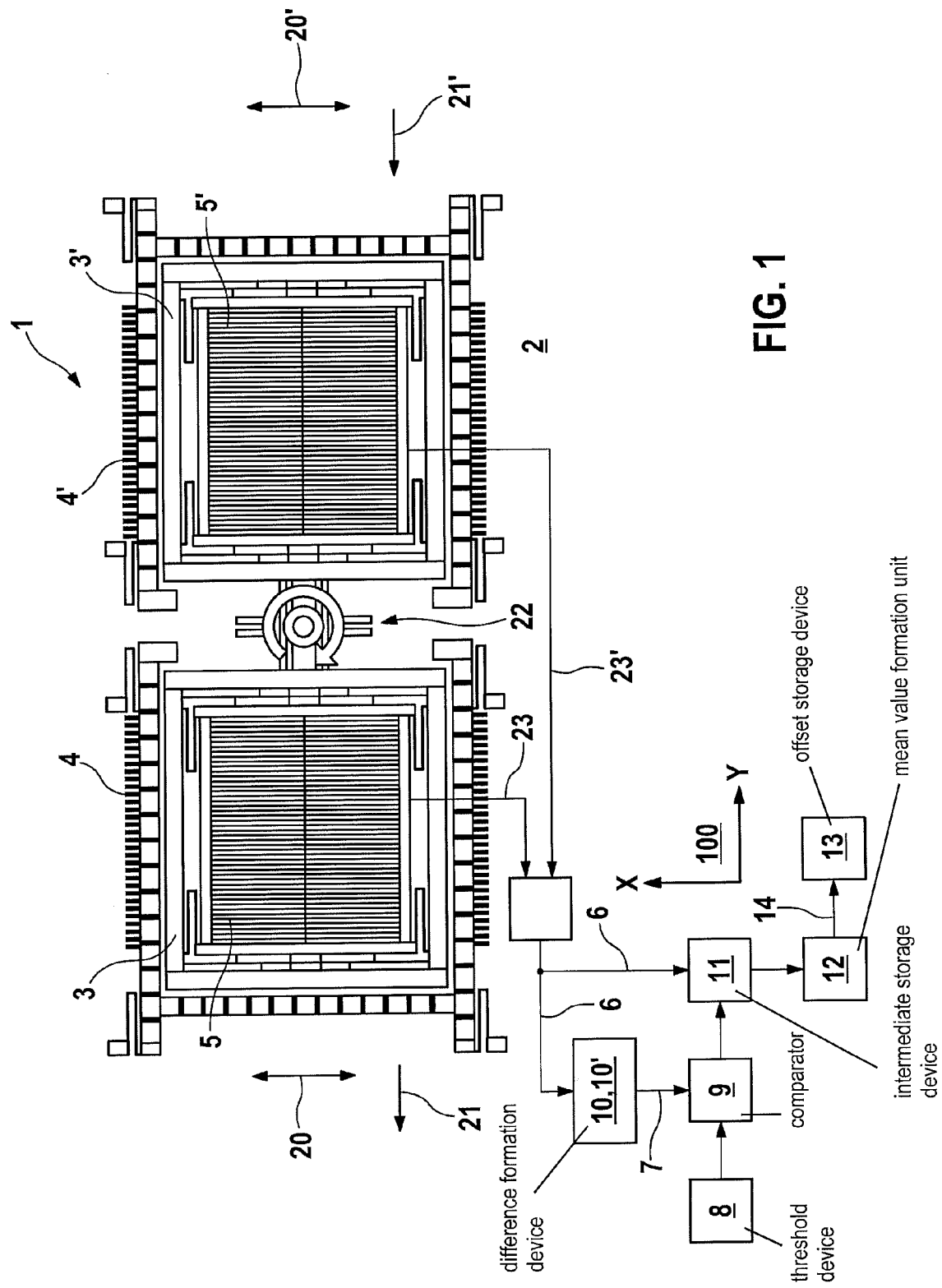
FIG. 1 shows a schematic view of a rotational rate sensor according to an exemplary first specific embodiment of the present invention.

In the various Figures, identical parts are provided with identical reference characters, and are therefore generally each only named or mentioned once.

FIG. 1 shows a schematic view of a rotational rate sensor 1 according to an exemplary first specific embodiment of the present invention, rotational rate sensor 1 having a first Coriolis element 3 and a second Coriolis element 3' situated alongside one another parallel to a main plane of extension 100 of a substrate 2. First Coriolis element 3 is excited by a first driver 4 to a first Coriolis oscillation 20, and second Coriolis element 3' is excited by a second driver 4' to a second Coriolis oscillation 20', the first and the second Coriolis oscillations 20, 20' being oriented antiparallel to one another along a first axis X parallel to main plane of extension 100. Given the presence of a rotational rate 22 about an axis of rotation perpendicular to main plane of extension 100, Coriolis forces act on first and second Coriolis element 3, 3', these forces extending substantially perpendicular to the axis of rotation and perpendicular to each of first and second Coriolis oscillations 20, 20'. Due to the Coriolis force, first Coriolis element 3 experiences a first deflection 21 relative to substrate 2, while second Coriolis element 3' experiences a second deflection 21' antiparallel to first deflection 21. A first measurement signal 23 is produced by a first detection device 5 as a function of first deflection 21, and a second measurement signal 23' is produced by a second detection device 5' as a function of second deflection 21'. First and second measurement signal 23, 23' are evaluated in differential fashion in order to produce a sensor signal 6 proportional to rotational rate 22; i.e., the sensor signal is calculated from the difference between the first and the second measurement signal. Alternatively, it is also possible for rotational rate sensor 1 to have only a single Coriolis element and no differential evaluation. In addition, it is possible that a rate of rotation parallel to the main plane of extension is detected, for example when first or second detection device 5, 5' is situated between substrate 2 and first or second Coriolis element 3, 3'.

In addition, rotational rate sensor 1 has a first difference formation device 10 that records at least two successive sensor values of sensor signal 6 and produces a rotational acceleration signal 7 that corresponds to the mathematical difference between the at least two successive sensor values. Rotational acceleration signal 7 is a measure of the dynamics prevailing at rotational rate sensor 1. If rotational rate sensor 1 is almost in a state of rest, i.e., there is no rotational rate 22, then rotational acceleration signal 7 is small, while this signal is larger given the presence of a rotational acceleration of rotational rate sensor 1. Alternatively, it is possible that rotational rate sensor 1 has a differentiator 10' instead of difference formation device 10, which calculates rotational acceleration signal 7 from the mathematical derivative of the curve of sensor signal 6. In addition, rotational rate sensor 1 has a comparator 9 that compares rotational acceleration signal 7 to a preset threshold value 8. If rotational acceleration signal 7 is below threshold value 8 for a determined and/or adjustable span of time, a self-calibration of rotational rate sensor 1 is automatically started. The threshold value comparison is used to recognize whether rotational rate sensor 1 is in a state of rest or in a state of motion, so that the self-calibration will be carried out only in the state of rest, and will not be disturbed or falsified by a movement of rotational rate sensor 1. If the threshold value is suddenly exceeded during the self-calibration process, the self-calibration is terminated. The self-calibration is restarted only when it is again the case that no motion is detected. Thus, rotational rate sensor 1 is continuously recalibrated in an autonomous manner, i.e., without an external trigger. Therefore, no external monitoring of the sensor offset is required. The sensor offset of rotational rate sensor 1 is therefore reduced. For the self-calibration, for example in an intermediate storage device 11 of rotational rate sensor 1 there is stored a multiplicity of sensor values of sensor signal 6, and a mathematical mean value is calculated from the stored sensor values by a mean value formation unit 12. In particular, only the mathematical sum of the sensor values is stored in intermediate storage device 11, and from this the mean value is formed by dividing the sum by the number of summed sensor values. The mean value corresponds substantially to the sensor offset of rotational rate sensor 1, and is stored as sensor offset 14 in an offset storage device 13 of rotational rate sensor 1. Preferably, however, sensor offset 14 is calculated from the sensor offset value newly calculated as a function of the mean value, as well as from an earlier sensor offset value, which for example was already stored in offset storage device 13 at a time before the execution of the current self-calibration. This earlier sensor offset value was for example preset at the factory, or was determined in the context of earlier self-calibrations. In order to communicate to a user that a self-calibration was carried out, an interrupt signal is sent to an interrupt interface at a time after the self-calibration. Alternatively, it is possible that a corresponding interrupt signal is outputted in order to communicate to a user that the self-calibration is currently taking place. The measurement mechanics of rotational rate sensor 1, including first and second Coriolis element 3, 3', first and second driver 4, 4', and first and second detector 5, 5', and including the components for carrying out the self-calibration, which include comparator 9, difference value formation unit 10 or differentiator 10', intermediate storage device 11, and the mean value formation unit, are preferably either integrated monolithically in the same substrate 2, or are realized in a hybrid design, i.e., the measurement mechanics are situated on a first substrate and the components for carrying out the self-calibration are situated on a second substrate, the first and second substrate being connected directly to one another using standard bonding technologies.

FIG. 2 illustrates a schematic block diagram of a method for calibrating a rotational rate sensor 1 according to an exemplary second specific embodiment of the present invention, rotational rate sensor 1 being in particular the same as rotational rate sensor 1 shown in FIG. 1. In a first query 30, it is checked whether the self-calibration mode of rotational rate sensor 1 has been activated at all. If the self-calibration mode is activated, then in a first method step 31 rotational acceleration signal 7 is compared to threshold value 8. If rotational acceleration signal 7 is greater than threshold value 8, first method step 31 is repeated (32). If rotational acceleration signal 7 is smaller than threshold value 8, in particular for a determined duration of time, then in a second method step 33 the automatic self-calibration of rotational rate sensor 1 is started. Here, sensor values of sensor signal 6 are recorded, in a third method step 34, and preferably the sum of the sensor values is stored. During this, in a fourth method step 35 it is constantly monitored whether rotational acceleration signal 7 remains below threshold value 8. If rotational acceleration signal 7 exceeds threshold value 8, the self-calibration is terminated, and rotational rate sensor 1 jumps back (36) to first method step 31. If rotational acceleration signal 7 remains below threshold value 8, then in a fifth method step 36 it is checked whether the number of sensor values required for a sensor offset calculation has been collected; here the number of sensor values required for the sensor offset value calculation is preferably freely configurable. If this condition is not met, then third method step 34 is repeated (37), and additional sensor values are collected. When the required number of sensor values has been reached, then in a sixth method step 38 a new sensor offset value is formed from the recorded sensor values by forming a mathematical mean value from the sensor values. A new sensor offset 14 is subsequently calculated from the new sensor offset value, as well as from the earlier stored sensor offset value. Subsequently, rotational rate sensor 1 jumps back to first method step 31.

What is claimed is:

1. A rotational rate sensor, comprising:
   a substrate;
   a Coriolis element;
   a driver to excite the Coriolis element to a Coriolis oscillation;
   a detection device to produce a sensor signal as a function of a deflection of the Coriolis element relative to the substrate based on a Coriolis force acting on the Coriolis element;
   wherein the rotational rate sensor is configured to carry out a self-calibration when a rotational acceleration signal produced as a function of the sensor signal falls below a threshold value; and
   a difference value formation unit configured to produce the rotational acceleration signal from a difference between at least two sensor values of the sensor signal.

2. The rotational rate sensor as recited in claim 1, further comprising:
   a comparator to compare the rotational acceleration signal to the threshold value.

3. The rotational rate sensor as recited in claim 1, further comprising:
   a differentiator that is configured to produce the rotational acceleration signal from a mathematical derivative of the sensor signal.

4. The rotational rate sensor as recited in claim 1, further comprising:
   an intermediate storage device configured to store a multiplicity of sensor values of the sensor signal during execution of the self-calibration, the intermediate storage device being configured to store a sum of the multiplicity of sensor values of the sensor signal during the execution of the self-calibration.

5. The rotational rate sensor as recited in claim 4, further comprising:
   a mean value formation unit configured to produce a new sensor offset value from a mathematical mean value of the sensor values stored in the intermediate storage device; and
   an offset storage device configured to store a sensor offset calculated as a function both of the new sensor offset value and of an earlier sensor offset value.

6. The rotational rate sensor as recited in claim 1, further comprising:
an interrupt interface, the rotational rate sensor being configured to produce an interrupt signal at the interrupt interface at least one of during and at a time after the execution of the self-calibration.

7. A method for calibrating a rotational rate sensor, the rotational rate sensor including a substrate, a Coriolis element, a driver to excite the Coriolis element to a Coriolis oscillation, a detection device to produce a sensor signal as a function of a deflection of the Coriolis element relative to the substrate based on a Coriolis force acting on the Coriolis element, wherein the rotational rate sensor is configured to carry out a self-calibration when a rotational acceleration signal produced as a function of the sensor signal falls below a threshold value, and a difference value formation unit configured to produce the rotational acceleration signal from a difference between at least two sensor values of the sensor signal, the method comprising:
exciting the Coriolis element to the Coriolis oscillation;
producing the sensor signal as a function of a deflection of the Coriolis element relative to the substrate on the basis of a Coriolis force acting on the Coriolis element;
producing the rotational acceleration signal as a function of the sensor signal,
wherein the rotational acceleration signal is the difference between the at least two sensor values of the sensor signal; and
carrying out a self-calibration of the rotational rate sensor when it is detected that the rotational acceleration signal has fallen below a specified threshold value.

8. The method as recited in claim 7, wherein the self-calibration is started when the rotational acceleration signal falls below the threshold value for a specified time span.

9. The method as recited in claim 7, wherein the rotational acceleration signal is produced from a mathematical derivative of the sensor signal.

10. The method as recited in claim 7, wherein for the self-calibration of the rotational rate sensor, a multiplicity of sensor values of the sensor signal are recorded, a sum of the sensor values being stored, and a new sensor offset value being calculated from the sensor values as a function of a mathematical mean value, a sensor offset being calculated both as a function of the new sensor offset value and as a function of an old sensor offset value.

11. The method as recited in claim 10, wherein the self-calibration is terminated when, during the self-calibration, it is detected that the rotational acceleration signal has exceeded the specified threshold value.

* * * * *